Dec. 1, 1964          A. M. TOCKER          3,159,096
COMBINED CONTAINER AND JUICER
Filed Sept. 24, 1962

INVENTOR.
ALFRED M. TOCKER
BY

United States Patent Office 3,159,096
Patented Dec. 1, 1964

3,159,096
COMBINED CONTAINER AND JUICER
Alfred M. Tocker, 401 College Hill Medical Tower,
3333 E. Central, Wichita, Kans.
Filed Sept. 24, 1962, Ser. No. 225,683
5 Claims. (Cl. 100—211)

The present invention relates to new and useful improvements in devices of envelope character suited to contain a piece of citrus or other pulpy fruit which can be manually squeezed to express juice from the piece of fruit and the expressed juice dispensed from the device with the bulk of the solid residue such as the rind, pulp, seeds and the like being retained in the device.

It is customary in the serving of certain foods and drinks to provide therewith a piece or wedge of a citrus or other pulpy fruit from which the consumer can, to suit his particular taste, manually squeeze juice to flavor the food or drink. Ordinarily the fruit is served in an exposed condition and the squeezing operation is conducted in an unsanitary manner involving finger contact with expressed juice, etc.

Serving the fruit in an exposed condition, especially in public eating places obviously entails risks of the same becoming contaminated in various ways among which can be mentioned the handling thereof by persons having such varied duties as to make maintenance of their hands in a condition of adequate cleanliness virtually impossible. Also, the squeezing operation is objectionable in that the same may express seeds, etc., into the food or drink along with the juice, and also for the reason that the fingers usually become wetted by the juice.

A primary object of this invention is to provide a combined container and juicer which will preserve as much as possible the esthetic appeal of food and drink garnishment by a piece or wedge of citrus or other pulpy fruit, but which will prevent exposure of such fruit to contamination, and which efficaciously can be manually squeezed to express juice from the fruit and to dispense the expressed juice as desired free of bulky fruit residue such as pulp and seeds.

Another important object of this invention in accordance with the preceding object is to provide a device of the described character having a normally sealed dispensing opening which can be unsealed immediately prior to the manual operation of expressing and dispensing the juice.

Yet another important object of the invention is to provide a device of the previously described character having an internal juice filtering barrier such that the bulky fruit residue is retained in spaced relation to the dispensing opening.

Broadly, the invention involves a device for manually expressing and dispensing juice from a piece of citrus fruit of the type including an envelope at least in part defined by a pair of superposed sheets of flexible material substantially impervious and inert to the juice, the improvement comprising said sheets being secured together at a plurality of positions that are spaced along a line, the spacing of such positions being such as to prevent the passage of the bulk of the fruit from the envelope across such line and such as to allow the flow of expressed juice between such positions. More specifically, the invention preferably involves the adjacent surfaces of the sheets being thermoplastic, said sheets being secured as defined by being thermally bonded to each other.

Broadly, another aspect of the invention involves a device for manually expressing and dispensing juice from a piece of citrus fruit of the type including an envelope at least in part defined by a pair of superposed sheets of flexible material substantially impervious and inert to the juice, said envelope having an interior adapted to receive a piece of citrus fruit and having an open juice dispensing end laterally bounded by said sheets communicating with the interior of the envelope, the improvement comprising said sheets being secured together at a plurality of positions spaced along a line spaced from and separating the open end of the envelope from the interior of the envelope, the spacing of such positions being such as to prevent the passage of the bulk of the fruit from the interior of the envelope to the open end thereof while allowing juice expressed from the piece of fruit to flow to the open end of the envelope, and means for releasably sealing the open end of the envelope.

Another aspect of the invention involves the outlet or dispensing opening of the device being defined by a plurality of spaced areas each circumferentially scored, and a common means attached to all of such areas for removing them and thereby opening the dispensing opening.

Other aspects, features and advantages will become apparent in the light of the following description of preferred embodiments taken in conjunction with the accompanying drawings illustrative thereof, wherein.

Figure 1:
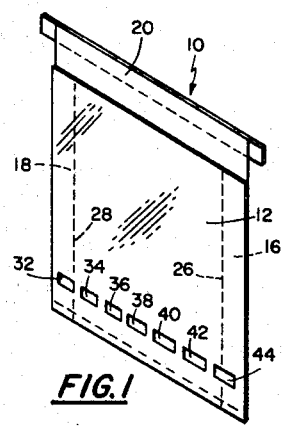
FIGURE 1 is an isometric view of a device according to the invention.
Figure 2:
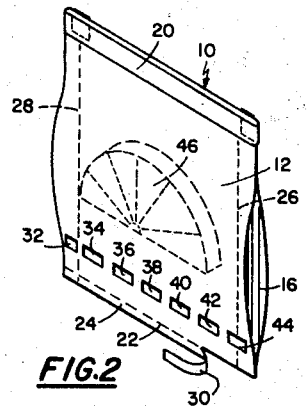
FIGURE 2 is an isometric view of the device of FIGURE 1, this view showing the same containing a slice of citrus fruit and with the seal of the dispensing opening partially torn away.
Figure 3:
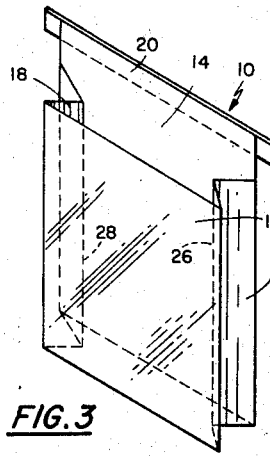
FIGURE 3 is an isometric view of the device of FIGURE 1 at a preliminary stage of manufacture.

Referring now to the drawings, wherein like numerals designate similar parts throughout the various views, attention is initially directed to the form of the invention shown in FIGURES 1 through 3 designated generally at 10.

The device 10 is comprised of flexible front and rear walls 12 and 14 of equal lateral extent, with infolding flexible side walls 16 and 18 connecting the side edges of the front and rear walls 12 and 14. The walls 12, 14, 16 and 18 are of equal downward extent, and the walls 12, 16 and 18 are of equal upward extent; however, the rear wall 14 is of somewhat greater upward extent. A strip of ductile metal 20 is secured to the upper end portion of the rear wall 14, as shown, such strip 20 having a greater length than the lateral extent of the rear wall so as to project at each end thereof beyond the lateral edges of the rear wall 14 for a purpose presently to be described.

At least the adjacent faces of the walls 12, 14, 16 and 18 are defined by a thermoplastic material that is substantially impervious to fruit juices and effectively chemically inert with respect to such juices at least insofar as solubility, flavor, taste and odor are concerned. In addition, such thermoplastic material of the walls 12, 14, 16 and 18 (which material can be an outer layer or coating if the walls are of composite, layered or laminated structure) is of such character as to be heat sealable or weldable. Preferably also, the walls 12, 14, 16 and 18 are transparent or at least sufficiently translucent, considering the thinness thereof, that fruit disposed between and in contact with such walls can be seen therethrough.

A number of plastics or resins are known of such thermoplastic character as to be suitable either in thin sheet or film form or as a filler and coating on a fibrous or textile sheet of material (such as paper or a woven fabric) for the flexible packaging of various foods with such packages being sealed or closed by conventional heat welding or sealing techniques. Such substances in thin sheet or film form or fiber or textile sheets filled and coated with such substances are generally suited for the walls 12, 14, 16 and 18 when of sufficient strength to withstand the use of the device 10, as will be presently described. The walls 12, 14, 16 and 18 can, for example, be made of thin sheets or film of a vinyl resin, or the walls can be of a laminated character of any flexible preferably transparent resin or plastic (such as cellulose acetate) and a vinyl resin, the layer of the latter constituting the adjacent layers of the walls so that the walls can be heat sealed or thermally bonded to each other for a purpose presently to become apparent.

The walls 12, 14, 16 and 18 in their configuration shown in FIGURE 3 can be formed of a continuous piece of tubing of the material constituting such walls folded to define the junctures of the walls 12 and 14 with the walls 16 and 18 as well as the central infolds of the latter walls. Alternatively, the walls can be formed by appropriate folding from a single sheet of flat material rolled or bent around into a tubular configuration with a marginal overlap, such marginal overlapping portions being secured together by adhesives, or by conventional heat sealing or thermal bonding techniques (not shown).

The lower end portions of the walls 12 and 14 are collapsed together with the lower end portions of the side walls 16 and 18 being infolded flatly therebetween, and the outer surfaces of the walls 12 and 14 are deeply scored along a line 22 spaced a short interval above the lower edges of the walls 12, 14, 16 and 18. Also, the portions 24 of walls 12 and 14 intermediate the line 22 and the lower edges of such walls are subjected concurrently to compressive pressure and heat in a conventional manner so that such portions 24 of the walls 12 and 14 lying intermediate the infolds 26 and 28 of the side walls 16 and 18 are heat sealed to each other, and additionally so that the surfaces of the side walls 16 and 18 in contact with such portions of the walls 12 and 14 are also heat sealed thereto. If, as preferred, the side walls 16 and 18 are of heat sealable material throughout their thickness, the described application of pressure and heat also heat seals the folded surfaces of the side walls 16 and 18 together below the line of scoring 22.

While the scoring of the walls 12 and 14 is of insufficient depth along the line 22 intermediate the infolds 24 and 26 to penetrate through either of such walls, the scoring of the walls 12 and 14 outside the infolds 24 and 26 is of greater depth and can be deep enough to penetrate substantially into the infolded walls 16 and 18, the arrangement being such that the portions of the walls 12, 14, 16 and 18 below the line of scoring can be easily torn away progressively by the use of the fingers as a single tear strip 30, thereby opening the heat sealed lower or dispensing opening of the envelope defined by the walls 12, 14, 16 and 18.

As will be apparent to those skilled in the art, the scoring along the line 22 can be accomplished before, during, or after the portions 24 of the walls 12, 14, 16 and 18 are heat sealed therebelow. The line of scoring 22 can be along the upper boundary of or spaced above the lowermost portions 24 of the walls 12, 14, 16 and 18 that are heat sealed together as thus far described.

Along a line immediately above or spaced a short interval above the line of scoring 22 and extending between overlapping the infolds 26 and 28 of the side walls 16 and 18, the walls 12 and 14 are heat sealed or strongly thermally bonded to each other and the side walls 16 and 18 at a plurality of spaced positions 32, 34, 36, 38, 40, 42 and 44. The purpose of the line of secured positions 32–44 is to prevent a piece of fruit 46 disposed in the device 10 (or the bulky residue—pulp and seeds—thereof after the fruit has been squeezed) from passing downwardly to the line of scoring 22 either before or after the tear strip 30 has been removed, but with the secured positions being spaced apart sufficiently for juice expressed from the piece of fruit 46 to pass to the line of scoring 22 and be dispensed from the lower end of the device 10 when the tear strip 30 is removed. The tear strip 30 can be removed either before or after the juice has been expressed to dispense the juice.

The walls 12 and 14 can be heat welded or bonded to each other and the infolded side walls 16 and 18 concurrently with, before, or after the scoring along the line 22 and/or the heat sealing of the portions 24 is accomplished.

As the walls 12, 14, 16 and 18 are securely and permanently bonded together at the positions 32–44, considerably greater application of heat and pressure is required to obtain a strong weld or thermal bond (though such positions can be properly termed as heat seals) than is necessary to merely obtain a sealing action as for the wall portions 24. Such application of heat and pressure necessary to obtain a strong bond may result without harmful effect in slight depressions in the external surface of the walls 12 and 14, and this fact is brought out in the drawings by showing such positions 32–44 of the wall 12 as being somewhat dimpled or depressed.

The operation of the device 10 is readily apparent. A piece of fruit 46 is placed in the open upper end of the envelope defined by the walls 12, 14, 16 and 18 after which the upper open end of the envelope is closed by infolding the upper end portions of the walls 16 and 18 and by placing the upper ends of the walls 12 and 14 together. The upper end portion of the wall 14 provided with the metal strip or tab 20 is folded over the top of the wall and the end portions of the tab 20 are then bent back around the wall 14 to retain the upper end of the device 10 closed. If desired the upper end of the walls can be rolled down about the tab for a turn or two prior to bending the extremities of the tab 20 back about the wall 14. The device 10 is now in condition to be delivered to and used by a person desiring the juice of the fruit 46.

Such use is accomplished preferably by initially tearing away the tear strip 30. The piece of fruit 46 is then squeezed manually by the use of the fingers through the flexible walls 12, 14, 16 and 18 to express the juice therefrom. The expressed juice flows between the walls 12 and 14 and between the secured positions 32–44 to be dispensed from the lower end of the device 10 that was opened by removal of the tear strip 30. While the line of spaced secured positions 32–44 permits the flow of juice therebetween, such line of secured positions 32–44 constitutes a barrier against the fruit 46 and the residue thereof passing from the device 10 before, during and after the juice is expressed therefrom, so as to constitute an internal filter in the device 10.

The lateral extent of each of the intervals between the individual members of the junctures 32–44 can conveniently be in the range of from about $\frac{1}{16}''$ to about $\frac{3}{8}''$ but can be less or greater as may be necesary or convenient. The lateral and vertical extents of each of the junctures 32–44 is such as lend adequate strength to each of the same to resist separation of the walls. In general, the over-all strength of the barrier constituted of the junctures 32–44 is increased when the ratio of the lateral extent of the junctures is increased relative to the lateral extent of the intervals therebetween.

In order to prevent discharge of seeds from the device 10, it is not essential that the lateral extent of the intervals between the junctures 32–44 be less than typical minimal dimensions of the seeds, this being true for the reason that the spacing between the walls 12 and 14 along each of such internals will normally be less than the lateral extent of such intervals. This is all the more true when the junctures 32–44 are spaced above the lower end of the walls 12 and 14 when the lower end is opened for the reasons that moist seeds will tend to be retained between the walls 12 and 14 below the junctures 32–44 by adhesion and the surface tension of the juice (though most of the juice will run freely from the device 10) and for the further reason that there is little likelihood that the user will inadvertently strip seeds from such lower marginal region of the device 10 by the use of his fingers.

As the device 10 is preferably transparent, the contents thereof can be visually inspected by the diner. If desired, of course, the walls 12 and 14 present external areas suitable for the display of advertising, instructions of utilization of the device 10, contents, identification, etc.

It will be apparent that, after the fruit 46 is placed in the device 10 and the device 10 is closed by the use of the tab 20, the piece of fruit 46 is not exposed and is not freely contacted by air so that any possibility of discoloration or drying by air contact is greatly reduced. Also, the use of the device 10 is such that the juice expressed from the piece of fruit 46 does not wet the fingers of the user and such juice is not contacted by the fingers. Furthermore, after the device 10 has been used to express and dispense juice from the piece of fruit 46, the residue of the latter is contained in an essentially unexposed manner as to be relatively unproductive of objectionable odors and unattractive to insects, etc., until the device 10 and its residue contents are finally disposed of as garbage.

Notwithstanding the fact that juice can readily pass between the heat sealed or thermally bonded junctures 32–44 (assisted somewhat by the expression of trapped air from the device 10 during squeezing of the device 10), the latter advantage stems from the fact that the walls 12 and 14 are normally at most in very closely spaced relation and are preferably normally in contact intermediate the thermally bonded junctures 32–44. Accordingly, the thermally bonded junctures 32–44 and the portions of the walls 12 and 14 adjacent thereto constitute a filtering barrier and a normally closed multichanneled passageway.

The walls 12, 14, 16 and 18 are preferably made as thin as possible, considering the strength of the materials of which they are constituted, in the interest of flexibility and economy of materials, but are of course made with sufficient thickness to withstand rupture during the squeezing operation.

If deemed necessary or desirable as for example in the interest of economy, the tab 20 can be omitted from the device 10, in which event the upper extents of the walls 12 and 14 could be equal; however, it is preferred in the case of such omission of the tab 20 that some means be provided for facilitating the opening of the upper end of the device 10 for reception of the piece of fruit 46 such as by the rear wall 14 having a greater upward extent.

Figure 5:
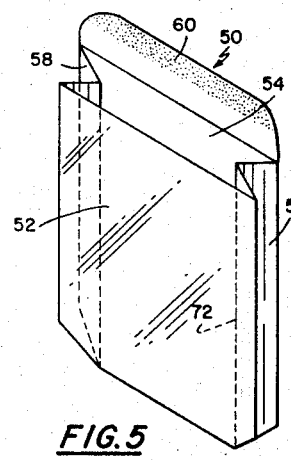
FIGURE 5 is an isometric view of the device of FIGURE 4 at a preliminary stage of manufacture.
Figure 4:
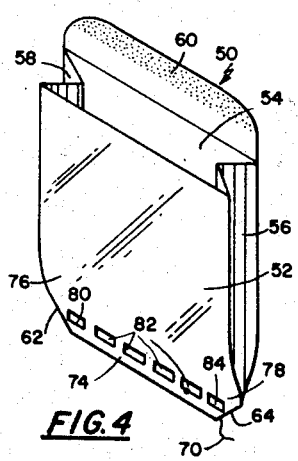
FIGURE 4 is an isometric view of a modified form of the device, this view showing the same with its filler opening open to receive a piece of fruit.
Figure 6:
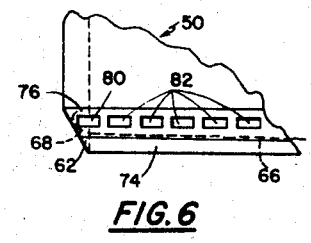
FIGURE 6 is an elevational detail view of the device of FIGURE 4.

Attention is now directed to the alternative form of the invention shown in FIGURES 4, 5 and 6, such alternative form of the invention being designated generally at 50. The device 50 differs from the previously described device 10 primarily as to the structure provided for opening the dispensing end of the device, and in the lower end edges of the device 50 being tapered adjacent the dispensing opening thereof.

FIGURE 5 illustrates the device 50 in a preliminary stage of manufacture, wherein it can be seen that the same comprises a front wall 52, a rear wall 54, and infolded side walls 56 and 58 connecting the front and rear wall 52 and 54. The rear wall 54 projects above the front and side walls 52, 56 and 58, with the projecting upper end of the rear wall 54 being preferably formed as an adhesive-coated flap 60 for closure of the upper end of the device. The flap 60 is foldable over the upper end portion of the front wall 52 for adherence to the latter to accomplish such closure.

The walls 52–58 are made of a material such as previously indicated as suitable for the walls 12–18 of the device 10 (although in the specific form of the invention shown in FIGURES 4–6 the outer surfaces of the side walls 56 and 58 are of heat sealable composition.

The lower lateral marginal edges of the walls 52 and 54 as well as the side walls 56 and 58 infolded therebetween are trimmed or tapered as indicated at 62 and 64. A flexible pull string of cotton, silk, linen or the like 66 is disposed between the walls 52 and 54, such string 66 for the major portion of its intermediate extent being spaced parallel a short interval above the lower edges of the walls 52 and 54. One end portion 68 of the string is disposed between the wall 52 and the infolded side wall 58, and the other end 70 of the string 66 extends freely from the device 50 through the lower dispensing end thereof at a position adjacent the fold 72 of the side wall 56.

The portion 74 of the walls 12 and 14 intermediate the string 66 and the lower edges of such walls is heat sealed together, and the portions 76 and 78 of the walls 52–58 adjacent the tapered edges 62 and 64 are all heat sealed together, the arrangement being such that the lower or dispensing end of the device 50 is sealed closed, the end portion 68 of the string being rather firmly fixed in the heat sealed area 76. The purpose of the described arrangement is that the lower or dispensing end of the device 50 can be opened by pulling the free end 70 of the string 66 downwardly as the intermediate portion of the string 66 serves to pass and cut progressively between the walls 52 and 54 along the heat sealed area 74. A the end of the pull on the string 66, the end portion 68 thereof can be pulled free and the string 66 thus separated entirely from the remainder of the device 50 can be disposed of.

Along a line spaced above and parallel to the normal position of the string 66 the walls 52–58 are thermally bonded strongly together at a plurality of spaced positions 80–84 in a manner analogous to and for the same purposes as the junctures previously described in connection with the device 10. The thermal bonds 80 and 84, it will be noted, preferably overlap the infolded side walls 56 and 58. As the junctures 80–84 must be strong, it is preferred that a greater application of heat and pressure be used in their formation than is used in heat sealing the area 74, as the latter seal need only be adequate for a temporary sealing function.

The use, function and advantages of the device 50 will be readily apparent in the light of the foregoing description of such aspects of the device 10.

Figure 7:
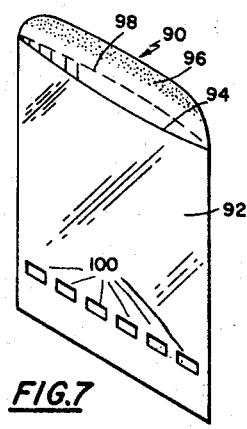
FIGURE 7 is an isometric view of another modification of the device.

Attention is now directed to the embodiment of the invention shown in FIGURE 7 designated generally at 90. The device 90 comprises an envelope open at its top and bottom ends and is comprised of front and rear walls 92 and 94 connected along their lateral edges. The walls 92 and 94 can be made of materials such as previously indicated as suitable for the walls 12–18 of the device 10. The walls 92 and 94 can be readily constructed of an integral piece of tubular material suitably creased or folded to define the junctures of the front and rear walls. The upper end of the rear wall projects above the front wall to constitute an adhesive-coated closing flap 96 foldable along a crease indicated at 98 whereby the upper end of the device 90 can be closed.

Along a line spaced above and parallel to the lower edges of the walls 92 and 94, the walls 92 and 94 are thermally bonded together at a plurality of spaced positions extending the latter extent of such walls. The structure and function of the junctures 100 are analogous to those of the junctures 32–42 of the device 10.

If desired or deemed expedient, the device 90 can be provided with means (not shown) analogous to those provided for the devices 10 and 50 for detachably sealing the lower open end of the same. Also, if deemed necessary or expedient such as for economy, the provision of means for closing the upper end of the envelope can be omitted.

The use, function and advantages of the device 90 are similar to those of the devices 10 and 50.

Figure 8:
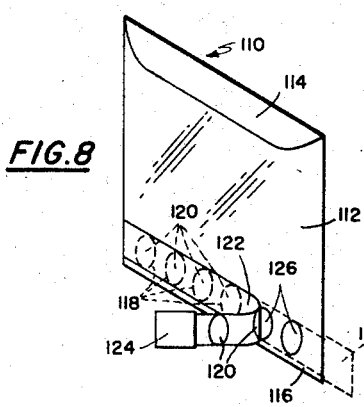
FIGURE 8 is an isometric view of yet another modification of the device, with the pull strip being shown as pulled to open partially the dispensing end of the device, the sealing position of the pull strip being shown in dotted outline.

Attention is now directed to the form of the invention shown in FIGURE 8 and designated generally at 110. The device 110 comprises an envelope formed of a front wall 112 and a rear wall (only the upper end flap portion of the latter being shown in the envelope closing position and designated at 114) joined along their lateral edges. The lower end portion 116 of the front and rear walls are heat sealed together to permanently close the lower end of the envelope. The peripheries 118 of a plurality of spaced circular areas 120 of the front wall 112 extending along and in spaced relation to the heat sealed portion 116 are deeply scored or cut and in fact are so nearly severed from the wall 112 that such areas 120 can be easily pulled from the wall 112. While it is essential that such areas 120 can be pulled from the wall 112 in the manner hereinafter described, it is also a desideratum, to be attained insofar as possible in conjunction with such essential consideration, that the scoring or cuts 118 do not actually penetrate entirely through the wall 112 or penetrate through the wall 112 so as to constitute small openings or perforations therethrough. The scoring 118 is preferably though not necessarily from the outside of the wall 112.

A strip of pressure sensitive tape 122 is adhesively secured along and to the side of the wall so as to extend over and also be adhesively secured to and cover the outside of the areas 120. The tape 122 is preferably transparent, and can be such as marketed under the trademark of the Minnesota Mining & Mfg. Co., Scotch. One end portion 124 of the tape projects beyond the lateral edge of the wall 112, and such projecting end 124 of the tape is either adhesively folded back upon itself or is free of adhesives so as to constitute a finger grip that is not sticky to the fingers by means of which the entire strip 122 can be progressively pulled from the wall 112 with the areas 120 adhering thereto. Pulling the strip of tape 122 from the device 110 opens the envelope adjacent its lower end so that a piece of fruit (not shown) contained therein can be squeezed and the juice expressed therefrom dispensed through the opening 126 created on removal of the areas 120.

The tape 122 is shown as displaced from its normal position shown in dotted outline at 128 and in the process of being removed from the device 110.

If desired or deemed expedient the front and rear walls of the device 110 can be thermally bonded together at a plurality of spaced positions (not shown) above and adjacent the areas 120 to form junctions similar in structure and function to the previously described junctures 32–44 of the device 10.

Among the advantages of the device 110 should be mentioned the fact that the areas 120 by virtue of their temporary retention as a part of the wall 112 prevent the tape 122 from coming into contact with the contents of the device 110 and also prevent the tape 122 from adhering to the rear wall.

The front and rear walls of the device 110 are preferably made of materials such as previously indicated as suitable for the walls 12–18 of the device 10.

It will thus be seen that according to the invention a variety of devices have been disclosed affording outstanding advantages in simplicity, low cost and disposability, and as to health and sanitation safeguards, while preserving the appeals of attractive and practical food garnishment.

It will be evident to those skilled in the art that the invention is readily susceptible to numerous variations and departures from the described and preferred embodiments thereof without departing from the spirit of the invention, and accordingly attention is directed to the appended claims in order to ascertain the actual scope of the invention.

I claim:

1. A combined container and juicer device for manually expressing and dispensing juice from a piece of citrus fruit contained therein, said device comprising a flexible envelope having an interior bounded by superposed imperforate first and second sheets of a flexible material substantially impervious and inert to fruit juice, said envelope having first and second openings bounded throughout their extents by marginal portions of the first and second sheets with said openings communicating with each other through the interior of the envelope whereby, respectively, a piece of fruit can be placed within and the juice thereof can be dispensed from the envelope, means restricting communication between the openings through the interior of the envelope, said means comprising the first and second sheets being secured together in superposed relation at a plurality of positions that are spaced along a line, said line traversing the interior of the envelope and isolating the openings from each other through the interior of the envelope, said line and the positions at which thhe sheets are secured together therealong being disposed between and spaced from both of said openings and the marginal portions of the sheets bounding said openings, and said sheets being movable from each other intermediate their plurality of secured positions whereby juice can pass from the interior of the envelope to be dispensed through the second opening.

2. The combination of claim 1, wherein the marginal portions of the first and second sheets bounding the second opening have coterminous edges.

3. The combination of claim 1, wherein the marginal portion of the first sheet bounding the first opening projects beyond the corresponding portion of the second sheet and constitutes a flap foldable over the latter portion to close the first opening, and said marginal portions of the first and second sheets bounding the second opening having coterminous edges.

4. The combination of claim 3, wherein said sheets are of thermoplastic material and are thermally bonded to each other at said plurality of positions.

5. A combined container and juicer device for manually expressing and dispensing juice from a piece of citrus fruit contained therein comprising generally rectangular superposed imperforate first and second sheets of a flexible material substantially impervious and inert to fruit juice, each of said sheets having first and second opposite side edges and first and second opposite end edges, with the respective first and second side edges of the first and second sheets being connected together, a plurality of connections of the first and second sheets constituting the sole connection of such sheets intermediate said connections of their respective opposite side edges, all of said plurality of connections being disposed and spaced from each other along a line extending between said connections of the respective opposite sides edges of the sheets, with said line and the plurality of connections spaced therealong being spaced from the first and to a greater extent the second end edges of both of said sheets, and said sheets being movable from each other intermediate their respective second end edges and said plurality of connections whereby a piece of fruit can be inserted between said second end edges to be received between the first and second sheets adjacent said plurality of connections.

References Cited by the Examiner

UNITED STATES PATENTS

| | | | |
|---|---|---|---|
| Re. 24,251 | 12/56 | Kaplan et al. | 222—107 |
| 1,163,507 | 12/15 | Carroll. | |
| 2,298,420 | 10/42 | Salfisberg | 99—77.1 |
| 2,389,747 | 11/45 | Stone et al. | 99—77.1 |
| 2,688,914 | 9/54 | Eckler | 100—211 |
| 2,787,548 | 4/57 | Dannenhoffer et al. | 99—77.1 |
| 2,791,324 | 5/57 | Knoop et al. | 99—77.1 X |
| 2,869,718 | 1/59 | Whelan | 99—77.1 |

FOREIGN PATENTS 560,381   9/57   Belgium.

WALTER A. SCHEEL, *Primary Examiner.*

A. G. STONE, CHARLES A. WILLMUTH, *Examiners.*